United States Patent [19]

Goetzmann et al.

[11] 4,293,381
[45] Oct. 6, 1981

[54] NUCLEAR REACTOR HAVING CONTROL ROD HOLDING LATCH

[75] Inventors: Claus Goetzmann, Erlangen; Peter Rau, Mittelehrenbach, both of Fed. Rep. of Germany

[73] Assignee: Kraftwerk Union Aktiengesellschaft, Mulheim an der Ruhr, Fed. Rep. of Germany

[21] Appl. No.: 705,434

[22] Filed: Jul. 15, 1976

Related U.S. Application Data

[63] Continuation of Ser. No. 549,827, Feb. 13, 1976, abandoned.

[30] Foreign Application Priority Data

Feb. 26, 1974 [DE] Fed. Rep. of Germany ....... 2409181

[51] Int. Cl.³ .............................................. G21C 7/08
[52] U.S. Cl. ................................... 376/230; 376/223; 376/232
[58] Field of Search .......................... 176/36 R, 40, 58; 74/424.8; 91/41-46; 92/30

[56] References Cited

U.S. PATENT DOCUMENTS

| 2,904,487 | 9/1959 | Dickson | 176/36 R |
| 2,938,847 | 5/1960 | Yoemans | 176/36 R |
| 3,020,887 | 2/1962 | Hobson et al. | 176/36 R |
| 3,405,032 | 10/1968 | Barrus et al. | 176/36 R |
| 3,775,247 | 10/1973 | Ode et al. | 176/36 R |

FOREIGN PATENT DOCUMENTS

| 1950646 | 4/1971 | Fed. Rep. of Germany | 176/36 R |
| 2409181 | 2/1974 | Fed. Rep. of Germany | 176/36 R |
| 1259927 | 1/1972 | United Kingdom | 176/58 R |

Primary Examiner—S. A. Cangialosi
Attorney, Agent, or Firm—Kenyon & Kenyon

[57] ABSTRACT

A nuclear reactor, control rod holding latch permits rapid insertion of the control rod into a reactor core by a ratchet and pawl mechanism arranged to lock the control rod against withdrawal, this being done through a screw which by rotation permits slow withdrawal of the control rod from the core, while keeping the control rod locked against withdrawal other than through the screw action.

6 Claims, 7 Drawing Figures

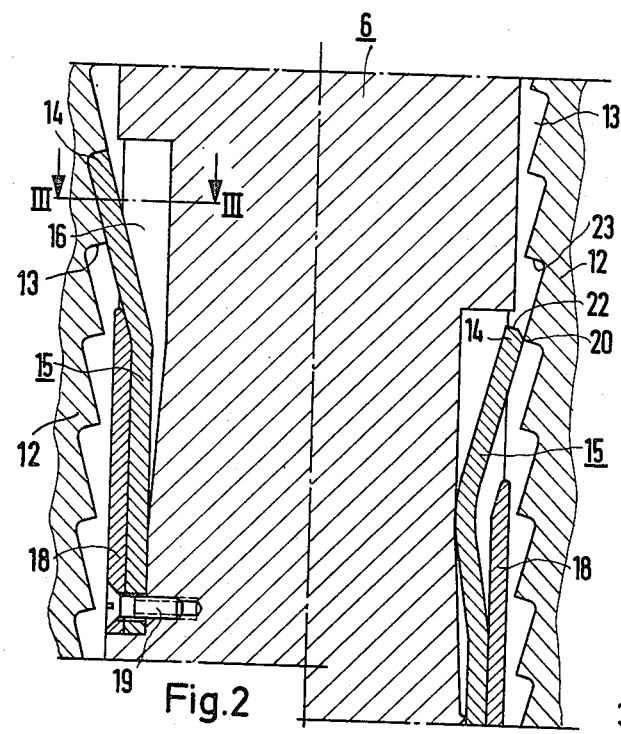
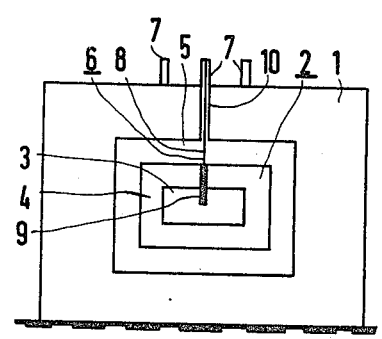
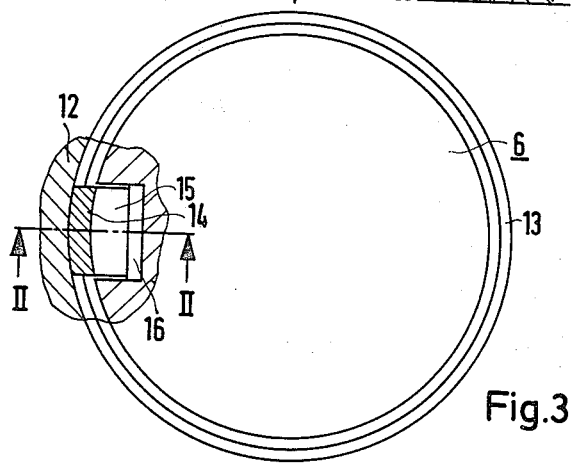
Fig.1
Fig.2
Fig.3

NUCLEAR REACTOR HAVING CONTROL ROD HOLDING LATCH

This is a continuation of application Ser. No. 549,827 filed Feb. 13, 1976, now abandoned.

BACKGROUND OF THE INVENTION

To control the reactivity of a nuclear core contained in the pressure vessel of a nuclear reactor, it is customary to use control rods which extend through the vessel into the core and which have inner ends provided with neutron-absorbing material, the rods being longitudinally moveable so that the material can be inserted more or less into the core. On the outside of the vessel the rods are provided with powered drives through which the control rods extend outwardly into pressure tubes into which the rods can be withdrawn and which, together with pressure-tight housings for the drives, confine the coolant pressure within the pressure vessel.

Such arrangements are normally vertical and in the case of conventional light-water reactors, the drives include holding latches which, when released, permit the rods to drop to scram the core. Such holding latches are of the ratchet and pawl type and do not by themselves hold the rods against upward motion withdrawing the neutron-absorbing material from the core.

If the integrity of the pressure confinement of the drives and rods should fail, the coolant pressure in the pressure vessel applies a force in a direction driving the rods away from the core, and if the drive mechanisms are unable to hold the rods, the neutron-absorbing material is withdrawn from the core so that the latter's reactivity is no longer under the control of that material. It is possible for the rods to be driven away from the core at high velocities.

A control rod can be locked against such inadvertent withdrawal, by using a screw and nut drive, but this does not permit rapid insertion of the rod. Therefore, it has become conventional to use a drive mechanism of the electromagnetically actuated, stepping type, with the holding latch of the ratchet and pawl type arranged to hold the rod upwardly against its weight during the stepping operation, the holding latch being inoperative to hold the rod against withdrawal or upward motion, the drive mechanism alone being relied on for this function.

This possibility of the control rod being suddenly driven away from the core by a pressure loss on the part of the drive's housing and the pressure tube extending from it, is very serious in the case of fast gas-cooled breeder reactors whose characteristics do not permit a control rod to be driven away from the core for even a brief time, in the event of trouble.

SUMMARY OF THE INVENTION

According to the present invention, a reactor of the above type is provided with a holding latch which holds the rod against displacement away and outwardly from the core, adjustably by positive screw action, but permits movement of the rod adjustably towards and into the core by non-rotative ratchet and pawl action. In other words, the rod is positively locked against withdrawal as in the case of a screw-acting drive, while permitting rapid movement of the rod towards and into the core by the previously described ratchet and pawl action which is, of course, a non-rotative action.

To effect the above, within the pressure confinement system on the outside of the pressure vessel, a rotative sleeve surrounds the rod within the pressure housing and has internal screw threads shaped in cross section to form rotative helical ratchet teeth pointing towards the core. The rod carries a pawl which locks the rod against withdrawal while permitting its insertion, the pawl working against the helical ratchet teeth. Insertion of the rod may be by any of the usual drives, including those providing for rapid insertion, but the rod is positively locked against withdrawal excepting by rotation of the sleeve, which may be effected by a drive such as has been used when entirely of the screw-acting type.

Advisably the control rod is provided with a plurality of latches distributed uniformly about its circumference at positions permitting the pawls to engage the helical ratchet teeth on the inside of the sleeve.

It is possible to provide the sleeve with standard threads, as contrasted to having a ratchet tooth cross section, with the control provided with a pinion meshing with these threads and with the pinion itself provided with a ratchet and pawl system locking the pinion against rotation permitting withdrawal of the rod, such withdrawal being effected by rotation of the sleeve which with the pinion locked, screws the rod outwardly. For insertion, the ratchet and pawl arrangement disengages with the pinion running down the internal threads of the sleeve. Also in this case, a plurality of the pinion arrangements should be distributed around the circumference of the control rod.

BRIEF DESCRIPTION OF THE DRAWINGS

Preferred modes for carrying out this invention are schematically illustrated by the accompanying drawings in which:

FIG. 1 is a vertical section of a fast gas-cooled breeder reactor;

FIG. 2 is a vertical section showing one form of the new holding latch, the portion on the left-hand side showing the latch engaged and the portion on the right-hand side showing the latch disengaging during forward control rod motion;

FIG. 3 is a cross section taken on the line III—III in FIG. 2;

DETAILED DESCRIPTION OF THE INVENTION

Figure 4:
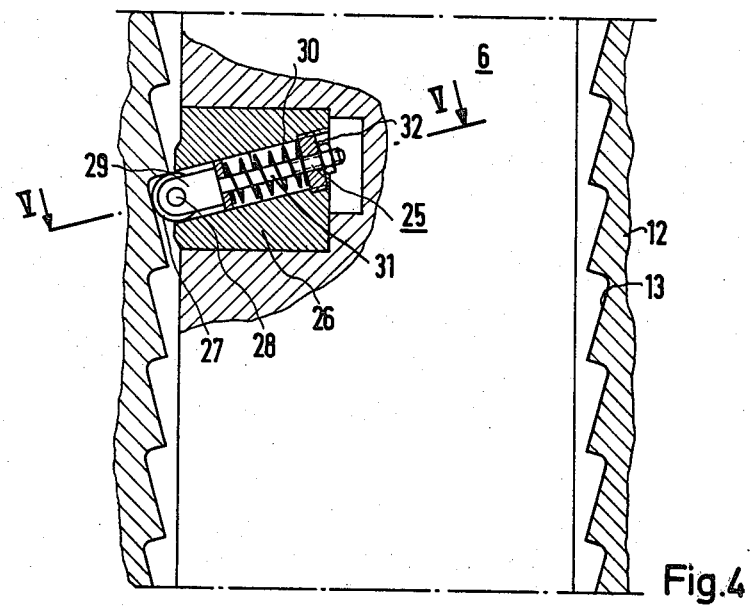
FIG. 4 is similar to FIG. 2 but shows a second form of the latch.

Having reference to the above drawings, the fast gas-cooled breeder reactor schematically represented by FIG. 1, may have a known type of prestressed concrete pressure vessel 1 enclosing the reactor core 2 formed by an inner fission core 3 and an outer breeder blanket 4. The core is cooled by gas such as helium, circulated through the space 5 around the core, and through the core, and although not shown, usually through a heat exchanger built into the vessel 1 for cooling the coolant and providing the useful thermal power output of the reactor.

For controlling the reactor output and the power distribution in the core, control rods 6 are shown which are vertically positioned and having drives (not illustrated), the coolant pressure within the space 5 of the vessel 1, being confined by pressure enclosures 7. These enclosures confine the pressure around the control rods and their drives while providing for the upward reciprocation of the vertical control rods. The drives may be electrical, electromagnetic or of pressure-medium design. The control rods include linkages 8 which suspend the neutron-absorbing parts 9, the linkages 8 working through passages 10 formed through the reactor pressure vessel 1 and externally sealed by the pressure enclosure 7. These various details are shown as to only one of the rods in FIG. 1 but it is to be understood that there are a multiplicity of such arrangements.

The coolant in the space 5 to which the pressure enclosure 7 necessary opens is under pressure. A serious leak on the part of any one of the enclosures 7 can immediately result in a high-pressure differential resulting in the control rod 6 being forced upwardly at high velocities which, in the case of the type of reactor here involved would result in serious consequences.

One form of the control rod holding latch of the present invention is shown in detail by FIGS. 2 and 3. As shown, the passage 10 illustrated by FIG. 1, may be lined with a sleeve 12 which is fixed against movement and surrounds the control rod 6. This sleeve could also be a part of the control rod drive enclosed by the pressure enclosure 7. This sleeve internally has a screw thread 13 shaped in cross section to form helical ratchet teeth pointing towards the core 2. The free or swinging end 14 of a pawl 15 engages the helical teeth of the sleeve, this pawl being in the form of a leaf spring or cantilever spring positioned in a slot 16 formed in the otherwise cylindrical control rod 6. This spring by its elasticity is biased so that its end 14 is always urged into engagement with the helical teeth 13 of the sleeve. In FIG. 2 the pawl is shown in its engaged position, on the left-hand side of this figure, positively preventing upward motion of the control rod, the sleeve 12 being positively fixed against vertical movement. On the right-hand side of FIG. 2, the pawl is shown disengaged due to downwardly motion of the control rod, the pawl then riding over one tooth crest after another as it is moved downwardly by the drive mechanism (not shown).

The outermost position of the cantilever spring is fixed by a guard 18 which, together with the spring is fixed to the control rod by a screw 19.

In operation, the control rod drive (unillustrated) can drive the control rod 6 downwardly towards the core 2 as rapidly as desired. If necessary, the rod can be dropped into the core. Withdrawal of the core is positively restrained, it being understood that ordinarily there would be a multiplicity of the latches uniformly distributed around the core at levels permitting the pawls to simultaneously engage the helical ratchet teeth of the sleeve. To effect withdrawal of the control rod, the sleeve 12 must be rotated as by using any of the available drives providing rotative motion. To lift the control rod, the lifting action must be accompanied by rotation of the sleeve 12 and is under the control of the screw action involved. It is impossible for the pressure in the vessel to rapidly drive the control rod away from te core, under any circumstances.

During insertion, shown in the right-hand side in FIG. 2, the edge 20 of the free end 14 of the pawl, can slide over the tip of the thread 13. Upward rod motion is impossible without rotation of the sleeve, because the upper side 22 of the pawl or cantilever spring, abuts the substantially horizontal surface 23 of one or another of the downwardly pointing helical teeth. When the cantilever spring 15, forming the pawl, is directed inwardly when riding over the teeth during downward rod motion, the spring leaves the guard 18 as shown, this guard 18 being made to limit outward motion of the pawl to that required for firm engagement of its end with the helical teeth, which are, of course, formed as a screw thread.

Figure 5:
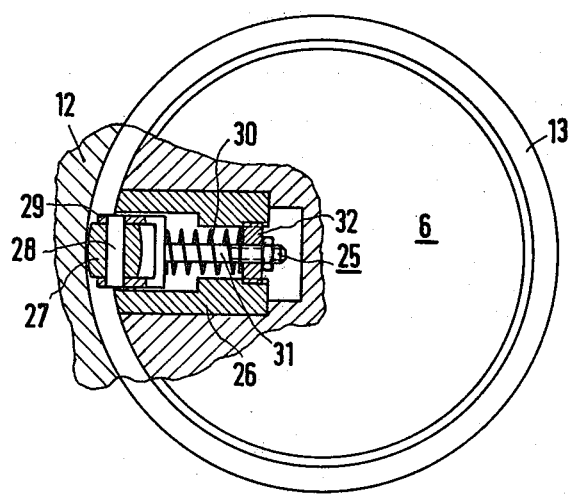
FIG. 5 is a cross section taken on the line V—V in FIG. 4.

In FIGS. 4 and 5 the pawl is formed by a plunger 25 which is guided in a slide ring 26, the operating end of the plunger being formed by a horizontal roller 27 journaled on a shaft 28 mounted by a fork 29, the slide ring 26 providing a guideway containing a compression spring 30 which urges the fork 29 outwardly under the control of a tension rod 31 anchored by a mounting 32 in the inner end of the slide ring 26. In this way a pawl is provided having a roller on its inner end and which is spring biased into engagement with the helical teeth 13. As shown by FIG. 5, the roller 27 is barrel-shaped to have a surface roughly corresponding to the curvature of the helical threads 13, facilitating rotation of the sleeve as required for withdrawal of the control rod. As shown, in this form the spring plunger on which the roller is mounted, declines towards the core, or downwardly. This permits the plunger arrangement to be made as a relatively light-weight component and still withstand any outward control rod displacement forces that can reasonably be expected to occur, keeping in mind that in this instance also a plurality of the pawls or plungers should be distributed around the circumference of the control rod.

Figure 6:
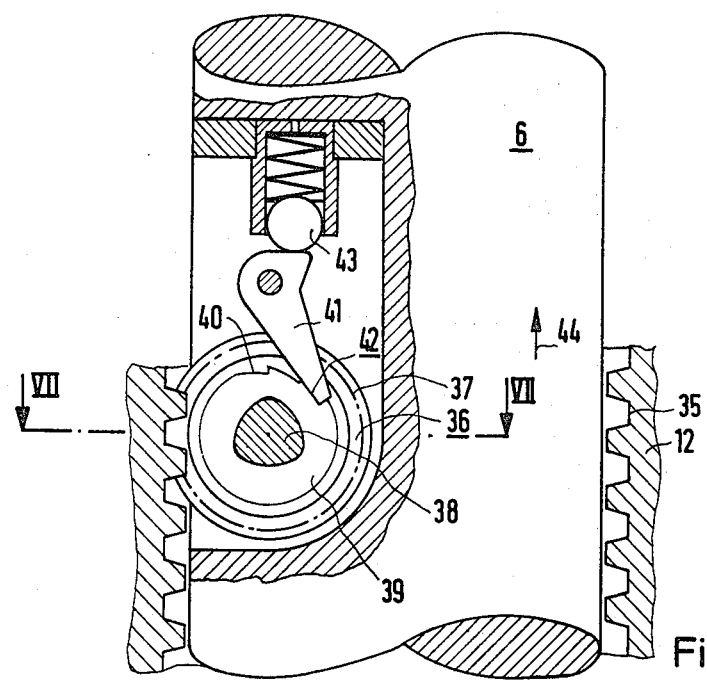
FIG. 6 is again like FIG. 2 but shows a third form.
Figure 7:
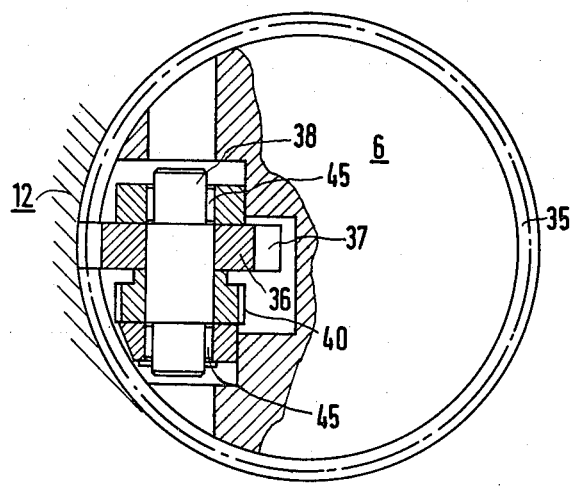
FIG. 7 is a cross section taken on the line VII—VII in FIG. 6.

Referring to the form shown by FIGS. 6 and 7, the sleeve 12 is provided with a symmetrical trapezoidal thread 35 with which the teeth of a pinion 36 engage. The teeth are not shown in detail but are indicated by the broken pitch circle 37. The pinion 36 is rigidly connected by a shaft 38 with a ratchet wheel 39 having ratchet teeth 40 cooperating with a pawl 41. The shaft 38 and the pawl 41 are fixed to the control rod 6 which has a suitable recess to accommodate the parts. A spring-loaded pressure body 43 biases the pawl 41 into engagement with the ratchet wheel teeth.

With the above arrangement the pinion 37 is locked positively against rotation in a direction permitting upward or withdrawal movement of the control rod. During insertion of the control rod the pawl 41 rides over the ratchet wheel teeth with the pinion running downwardly and turning idly, the screw threads of the sleeve 12 functioning then in the manner of a gear rack. This form permits the use of standard screw threads and gear teeth.

The ratchet teeth, shown at 42, and the pawl 31 are subject to wear, but by loosening the shaft 38 shown as being mounted by needle bearings 45, these parts can be replaced. The pawl and the ratchet wheel 39 are small and easy to make. The continuous engagement of the pinion 36 with the thread 35 assures low-wear operation of the other latch parts, particularly of the thread 35 formed on the inside of the rotative sleeve 12, the sleeve 12 representing a fairly large element and one which might possibly be built into or as a part of the reactor pressure vessel.

What is claimed is:

1. A reactor comprising a pressure vessel containing a core and having at least one vertically movable control rod assembly having a neutron-absorbing portion adapted for vertical insertion and removal from said core and a solid rod portion adapted to actuate the neutron-absorbing portion, said solid rod portion being surrounded by an integrally internally threaded sleeve which is vertically immovable and said solid rod portion carrying latch means engaging said screw thread with a ratchet and pawl action permitting said solid rod portion to be moved freely and rapidly towards said core so as to insert said neutron-absorbing portion into said core but positively preventing said solid rod portion from moving freely and rapidly away from said core, said sleeve and solid rod portion being relatively rotative so as to provide a screw drive for said solid portion.

2. The reactor of claim 1 in which said screw thread is shaped in cross section to form helical ratchet teeth pointing towards said core, and said latch means is formed by a leaf spring fixed to said solid rod portion and extending away from said core and having an end engaging said teeth so as to act as a pawl.

3. The reactor of claim 1 in which said screw thread is shaped in cross section to form helical ratchet teeth pointing towards said core, and said latch means is formed by a spring-loaded plunger having an end engaging said teeth and being fixed to said solid rod portion with a declination towards said core so as to act as a pawl.

4. The reactor of claim 1 in which to form said latch means a pinion is rotatively fixed to said solid rod portion and has teeth meshing with said threads, a wheel having ratchet teeth is fixed to said pinion, and a pawl is fixed to said solid rod portion and engages said teeth to lock said wheel against rotation in a direction permitting said solid rod portion to move away from said core while permitting said wheel to rotate reversely.

5. The reactor of claim 3 in which said end of said plunger has a rolling element mounted thereon, through which said end engages said teeth.

6. A fast gas-cooled reactor comprising a concrete pressure vessel containing a core and having a space for containing a pressurized gas coolant, said vessel having a concrete top wall having an outside and an inside and through which wall at least one vertical passage is formed, a vertical control rod assembly depending through said passage with a neutron absorbing lower portion insertable in said core and an upper portion extending from said lower portion to above said outside of the wall and having a solid rod portion above said inside of the wall, a pressure enclosure extending upwardly from said outside of said wall and enclosing said upper portion of said control rod assembly so as to prevent escape of pressurized gas coolant from said space via said passage, a leak in said pressure enclosure permitting escape of said pressurized coolant producing a force driving upwardly said control rod assembly, a vertically immovable sleeve surrounding said solid rod portion of the control rod assembly at a position above said inside of said top wall and integrally having internal screw threads, said control rod assembly and said sleeve being rotative relative to each other, and ratchet means carried by solid rod portion of said assembly so as to engage said screw threads with a ratchet and pawl action permitting said solid rod portion and said assembly to move rapidly downwardly and positively holding said control rod assembly against said driving upwardly independently of relative rotation between said control rod assembly and said sleeve, and said relative rotation causing vertical movement of said control rod assembly by screw action of said ratchet means and said screw threads.

* * * * *